United States Patent [19]
Rossi

[11] Patent Number: 4,951,931
[45] Date of Patent: Aug. 28, 1990

[54] ADJUSTABLE LOCATING BLOCK

[75] Inventor: Cristiano G. Rossi, Birmingham, Mich.

[73] Assignee: Chrysler Corporation, Highland Park, Mich.

[21] Appl. No.: 427,394

[22] Filed: Oct. 27, 1989

[51] Int. Cl.$^5$ .............................................. B23Q 3/18
[52] U.S. Cl. ..................................... 269/69; 269/305; 269/315
[58] Field of Search ................ 269/303–306, 269/315, 316, 99, 95, 71, 73, 82, 69; 298/124, 229

[56] References Cited

U.S. PATENT DOCUMENTS

| | | | |
|---|---|---|---|
| 3,024,018 | 3/1962 | Manz | 269/71 |
| 3,626,600 | 12/1971 | Gaither | 269/315 |
| 3,827,686 | 8/1974 | Storkh | 269/315 |
| 3,848,865 | 11/1974 | Bird | 269/69 |
| 4,022,454 | 5/1977 | Bredvik | 269/315 |
| 4,026,535 | 5/1977 | Heath | 269/45 |
| 4,030,718 | 6/1977 | Philipoff | 269/315 |
| 4,275,872 | 6/1981 | Mullis | 269/77 |
| 4,317,560 | 3/1982 | Troyer | 269/71 |
| 4,669,227 | 6/1987 | Treppner | 269/900 |

*Primary Examiner*—Robert C. Watson
*Attorney, Agent, or Firm*—Edward A. Craig

[57] ABSTRACT

The present invention is an improved adjustable locating block assembly for use on a fixture to hold a work piece. The assembly includes a locating block with a slot formed therein, a slot formed in a portion of a fixture to which the locating block is to be secured, and an intermediate block with raised surface portions on each side thereof adopted to mate with respective ones of the slots. The respective mating slots and raised surface portions have longitudinal axis extending at substantially right angles to each other. The locating block and intermediate block are secured to a fixture support with a slot formed therein such that the raised surface portions are adjustably positioned within the slots. Rows of holes are made opening into the slots and through the raised surface portions. Once the holes are aligned, rods are inserted to lock the locating block in a particular position.

15 Claims, 2 Drawing Sheets

U.S. Patent  Aug. 28, 1990  Sheet 1 of 2  4,951,931
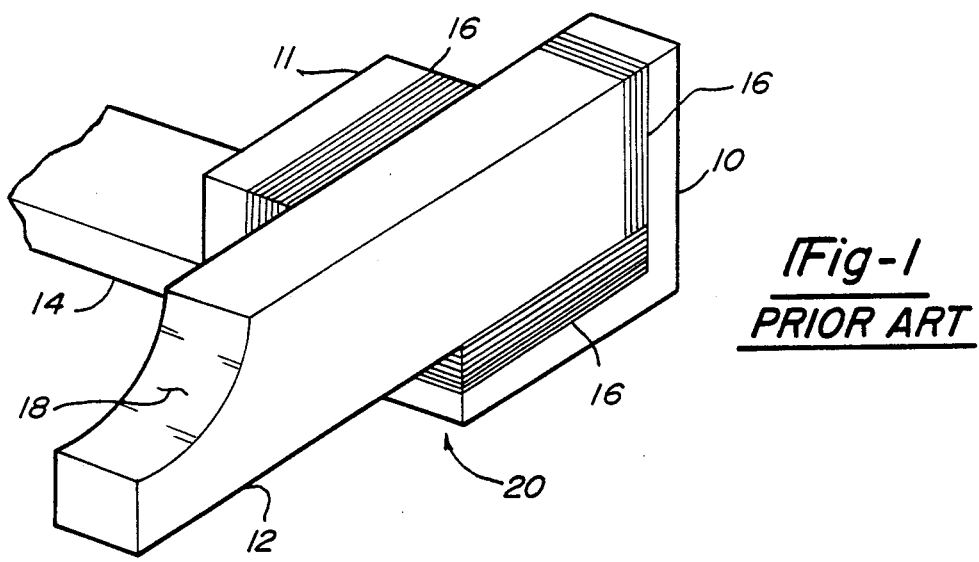
*Fig-1*
PRIOR ART
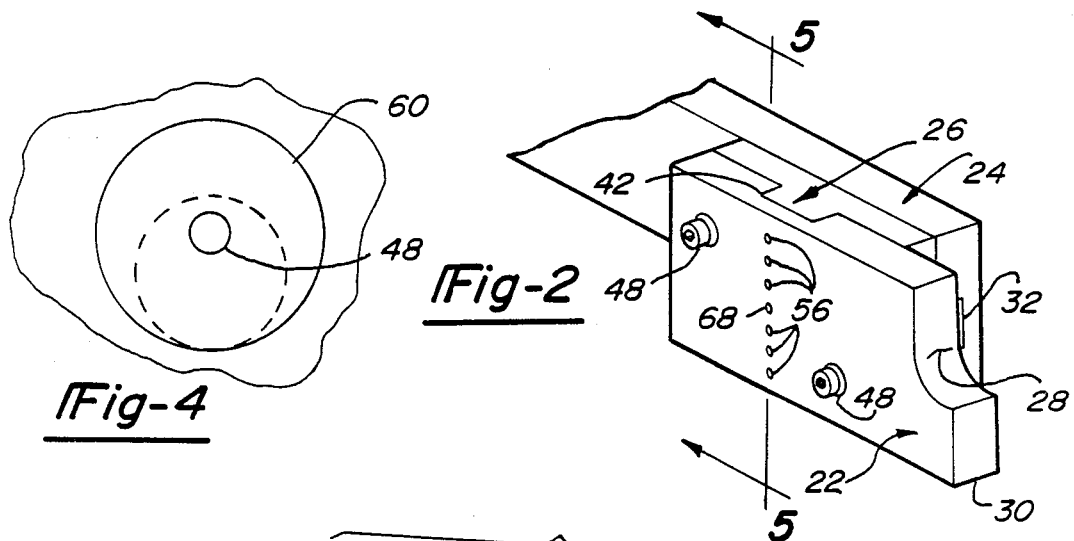
*Fig-2*
*Fig-4*
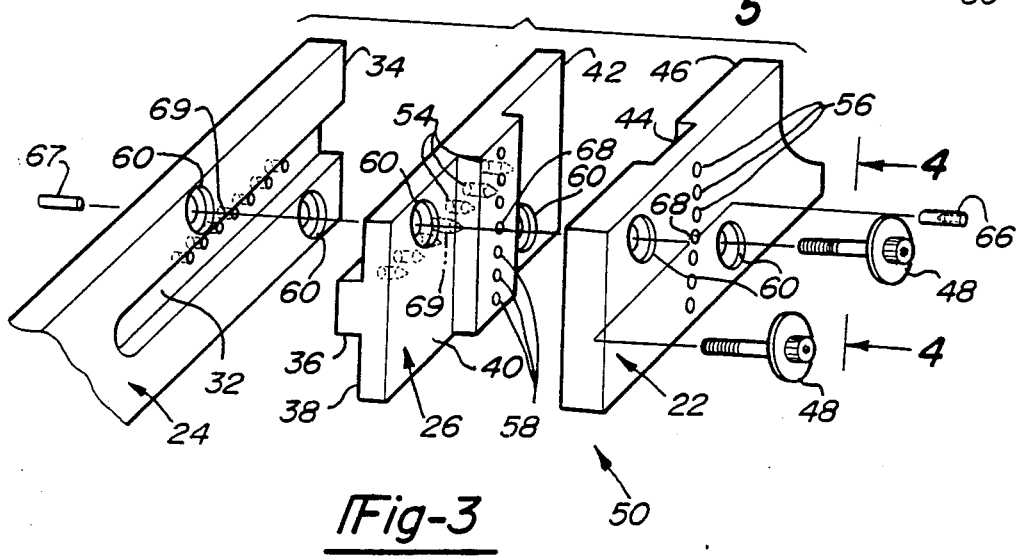
*Fig-3*

ADJUSTABLE LOCATING BLOCK

BACKGROUND OF THE INVENTION

1. Field of the Invention

The present invention relates generally to locating blocks used in a fixture, and more particularly, to incrementally adjustable locating blocks which may be used in assembling sheet metal parts of an automobile.

2. Discussion

Portions of an automobile body are customarily assembled by mounting parts in work fixtures, adjusting the parts so that they come together in exactly the right position and then welding the parts together. That portion of the automobile, now assembled, is removed from the work station fixture and the same process is repeated for a new batch of parts to be assembled in the same manner. This method of assembly is commonly used to assemble sheet metal panels.

Each fixture may have many principle locating point (P.L.P.) blocks, where each block contacts a part and holds it in position to be adjoined to other parts. Because each batch of parts may be slightly different from its equivalent part in the previous assembly, the P.L.P. blocks may have to be adjusted slightly to accommodate this difference.

A P.L.P. block has been made to be mounted on L-shaped steel blocks forming a mounting unit which is attached to the fixture. To make minor adjustments of the P.L.P. block, shim plates are inserted between the P.L.P. block and the two L-shaped blocks comprising the mounting unit. Using shim plates either under the P.L.P. block and/or on the sides of the P.L.P. block, the P.L.P. block can be adjusted in the x, y, or z plane to suit a particular assembly. However, there are some disadvantages to using the shim plates for adjustment purposes. One disadvantage, is that the shim plates are not permanently attached to the mounting unit and therefore, when the P.L.P. blocks are realigned for the next assembly of parts, the shim plates are sometimes misplaced. Another disadvantage is that in using shim plates there is no one reference point for the P.L.P. blocks to be positioned to begin each new assembly. A great deal of time can be lost just trying to get the P.L.P. blocks back in a reference position for the next assembly. Yet another disadvantage is that the L-shaped blocks used for the mounting unit are bulky and may result in a large mounting unit which requires a lot of floor space to set up the fixture.

Currently, a need exists for improvements in these fixture locating blocks. Locating blocks are needed which are adjustable and do not rely on shim plates, are overall smaller in size, and which may be easily relocated to an established reference point after each assembly is complete.

SUMMARY OF THE INVENTION

The present invention provides adjustable locating blocks designed to satisfy the aforementioned needs. The apparatus of the present invention is incrementally adjustable independent of shim plates. The apparatus incorporates parallel blocks for a mounting unit instead of L-shaped blocks. This results in the present invention being smaller in size than locating blocks which use L-shaped blocks for a mounting unit. The present apparatus also provides a means for manually returning the locating blocks to their respective established reference points in a quick and easy way.

The foregoing and other objects and advantages will become more apparent when viewed in light of the accompanying drawings and following detailed description.

DESCRIPTION OF THE DRAWINGS

FIG. 1 is a perspective view of a presently utilized mounting unit having L-shaped blocks and shim plates for adjusting a locating block (P.L.P. block), for use on a fixture;

FIG. 2 is a perspective view of one embodiment of the present invention showing keyed locating blocks assembled in a parallel fashion extending from a fixture (the fixture is not shown entirely);

FIG. 3 is an exploded perspective view of the locating blocks of FIG. 2;

FIG. 4 is a sectional view taken substantially along the line 4—4 of FIG. 3 looking in the direction of the arrows at the enlarged connecting bolt holes;

BRIEF DESCRIPTION OF A PREFERRED EMBODIMENT

Figure 7:
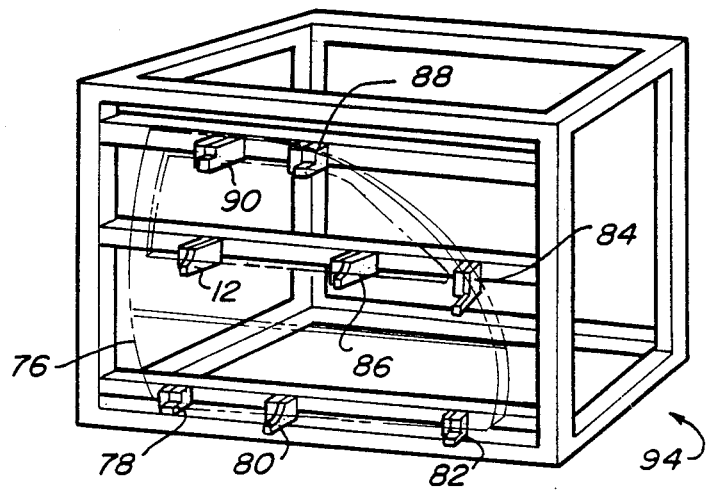
FIG. 7 is a perspective view of a fixture assembly having many locating blocks in contact with a sheet metal panel shown in phantom.

Referring to FIG. 1, there is shown one set of L-shaped blocks 10, 11 and a locating (P.L.P.) block 12 for use on one arm 14 of a fixture. FIG. 1 is not part of the present invention and is shown as a contrast to the present invention. The L-shaped blocks 10, 11 are indicative of the old design which employs shim plates 16 to adjust the locating block 12 along three mutually perpendicular axis. The two L-shaped blocks 10, 11 form a mounting unit 20 for the locating block 12. The locating block 12 is designed to make contact with a part 76 as shown in FIG. 7. The surface 18 of the locating block 12 which contacts the part 76 is shaped to conform to a surface of the part 76 to be held in place. Of course, this surface 18 could have many different sizes and shapes to match the many different parts which may be assembled using this tool. It should also be noted that only one locating block 12 and mounting unit 20 are shown in FIG. 1 but that in an actual assembly 94 as shown in FIG. 7, many locating blocks 12, 78, 80, 82, 84, 86, 88, 90 are arranged on a single fixture 94 to assist in assembling a portion 76 of an automobile comprised of many parts being welded or otherwise permanently adjoined.

In FIG. 2, one embodiment of the locating block assembly 50 of the present invention is shown. From FIG. 2, it is apparent that the L-shaped blocks are not a part of the present invention and neither are shim plates. Locating block assembly 50 includes a locating block 22 and intermediate block 26 supported by a fixture support 24 neither of which are as bulky as the L-shaped blocks 10, 11 of the old design. The locating block 22 shown in FIG. 2 has a forwardly projecting end surface 28 shaped similarly to the locating block 12 of FIG. 1. It should be kept in mind that the locating blocks 12, 22 can vary in shape and size to accommodate different parts. The present embodiment shown in FIG. 2, has a curved surface 28 carved from one end 30 and is shown for example purposes only.

As best seen with reference to FIG. 3 an elongated fixture support 24 is provided with a slot 32 extending longitudinally inward from one end 34 thereof which slot is designed to accommodate an elongated raised portion 36 provided on a side 38 of an intermediate block 26. The elongated raised portion 36 is designed to be received in and slide along the elongated slot 32 in the fixture support 24 thereby providing adjustable movement along a first axis. On the opposite side 40 of the intermediate block 26 a second elongated raised portion 42 is provided extending in a direction generally perpendicular to that of portion 36 which is designed to be received in and slide along an elongated slot 44 provided on one side 46 of the locating block 22. Once the raised portions 36, 42 of the intermediate block 26 are placed within slots 32, 44 of the fixture support 24 and locating block 22 respectively, one or more bolts 48 may be passed through aligned openings provided therein to thereby connect all three components 22, 24, 26 together. It should be noted that slots 32, 44 and raised surface portions 36, 42 can vary in size and shape without defeating their intended purpose.

Figure 6:
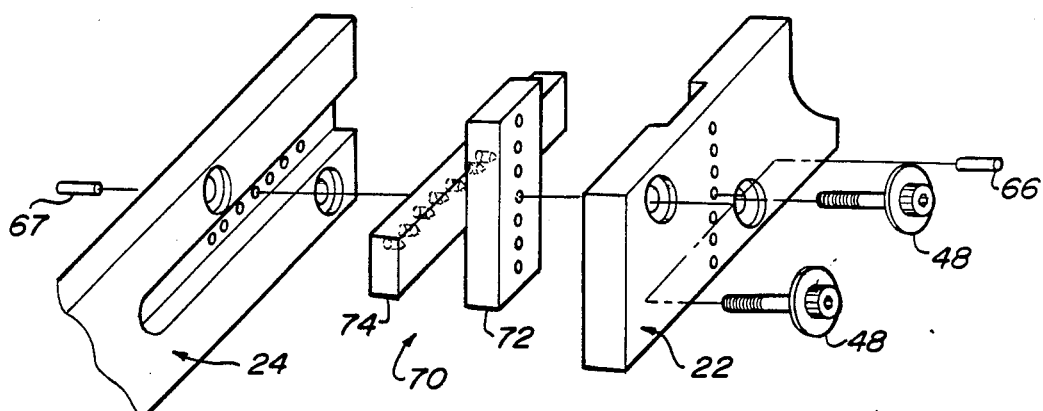
FIG. 6 is an exploded perspective view showing another embodiment of the present invention.

A row of longitudinally aligned, spaced holes 52 extend through support 24 each of which opens into slot 32 and are arranged to be aligned with a row of longitudinally spaced holes 54 provided in the horizontal raised portion 36 of the intermediate block 26. Another row of longitudinally aligned spaced holes 56 is also provided extending through block 22 each of which opens into slot 44 thereof so as to be alignable with a row of longitudinally aligned spaced holes 58 in the vertical raised portion 42 of the intermediate block 26. In the preferred embodiment the holes 52, 54, 56, 58 are arranged as shown in FIG. 6 to allow as little as one millimeter incremental adjustment of the locating block. Each row of holes 52, 54 and 56, 58 are aligned at the center hole 68, 69 in the rows while the remainder of holes are offset from their respective mating holes beginning with a 1 millimeter offset between the first adjacent pair of holes; 2 millimeters offset between the second adjacent pair of holes; and 3 millimeters offset between the third adjacent pair of holes. The offsets are arranged so that the locating block may be shifted up or down along the intermediate block and the intermediate block may be shifted back and forth along the fixture support to obtain the adjustment needed. Of course other incremental offsets could be used in an appropriate application. Once center holes 68, 69 are made, a template can be placed in the slots 32, 44 and on the raised surface portions 36, 42 to accurately make the remaining holes in the rows a proper distance apart. The template (not shown) would be located and held in place based from the center holes 68, 69. Other arrangements for the holes would fall within the scope of this invention.

A pair of bolt holes 60 are provided extending through all three components 22, 24, 26 as shown in FIG. 3. The holes 60 are enlarged in diameter relative to the diameter of bolts 48 to allow for adjustment of the three components 22, 24, 26 without removing the bolts 48. An enlarged bolt hole is shown in FIG. 4. Two bolts 48 are preferred but one or more bolts could be used effectively.

Figure 5:
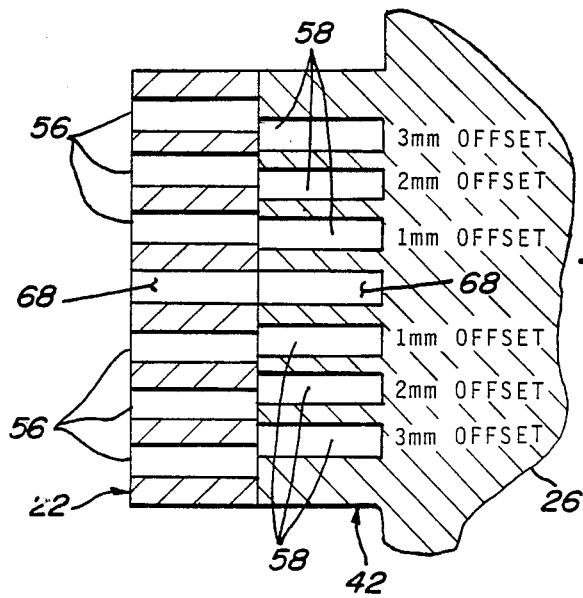
FIG. 5 is a fragmentary section view taken substantially along line 5—5 of FIG. 2 showing a hole offset alignment arrangement.

A laser beam may be used to position the locating block 22 at an established reference point which theoretically, is the location where all parts would be held in place to be adjoined if they were always identical in size and shape. Since the same parts may be microscopically different in size and shape, their position with respect to other parts may require slight adjustment. To make this adjustment, the locating block 22 which contacts a part may be moved in one or more directions. To do this, the bolts 48 are loosened which enables the locating block 22 and the intermediate block 26 to be slightly pulled apart. One or more rods 66, 67, which have been inserted into respective ones of aligned holes 52, 54, 56, 58 previously, are removed from the holes 52, 54, 56, 58 and the locating block 22 and/or the intermediate block 26 are shifted the required direction. The rods 66, 67 may be shoulder screws in the appropriate application so that they may be easily removed from the holes. Since the holes 52, 54, 56, 58 are positioned in an offset fashion as shown in FIG. 5 in the preferred embodiment, the locating block 22 and the intermediate block 26 may be shifted in increments of one or more millimeters horizontally or vertically. Once the exact position is found (where the locating block 22 properly contacts the work part), the rods 66, 67 are inserted into the new hole alignments in the slots 32, 44 and raised surface portions 36, 42. The locating block 22 and intermediate block 26 are brought tightly back together and secured by tightening the bolts 48. With the rods 66, 67 now in different holes 52, 54, 56, 58 the locating block 22 is in exact position to hold the part to be adjoined. By knowing how many holes the locating block 22 and intermediate block 26 have shifted, the operator can then return both blocks 22, 26 to their initial reference position or starting location with very little problem. There are no shim plates to worry about losing and a reference location 68, 69 can be clearly established. By moving the intermediate block 26 and locating block 22 along the holes 52, 54, 56, 58 in fixed, predetermined increments, the operator always knows how far from the reference location 68, 69 he has moved the locating block 22. The fixture does not have to be recertified by a laser to be brought back to a reference location 68, 69 because the reference location 68, 69 can be marked on or near the holes 52, 54, 56, 58 which were originally aligned when the locating block was first certified (determining theoretical location of all locating blocks in a fixture, positioned to assemble theoretically perfect parts).

In FIG. 6 another embodiment of the present invention is shown. It is generally like the embodiment of FIG. 3 except intermediate block 70 is made of two joined pieces 72, 74 having similar rows of holes. Pieces 72 and 74 are similar to the raised surface portions 36, 42 of intermediate block 26. The thickness of pieces 72 and 74 may equal the depth of the respective slots. This allows the inside surfaces of the fixture support 24 and the locating block 22 to abut when assembled by the bolts 48. This makes the assembly even more compact and easier to fabricate. Although, seven holes are shown in each row, it should be appreciated that a greater or lesser number of holes in each row could be used in an appropriate application.

It is thought that the improved locating block assembly and method of the present invention and many of its attendant advantages will be understood from the foregoing description and it will be apparent that various changes may be made in the form and construction of the components thereof without departing from the spirit and scope of the invention or sacrificing all of its material advantages, the form hereinbefore described being merely a preferred or exemplary embodiment thereof.

What is claimed is:

1. An improved adjustable locating block assembly for use on a fixture to hold, guide, restrain or otherwise control, a part to be worked on, the locating block assembly comprising:

support means associated with said fixture;

a locating block supported on said support means;

means for incrementally adjusting said locating block with respect to said support means independent of shim plates;

said means for incremental adjustment including an elongated slot formed in one side of said support means, an elongated slot formed in one side of said locating block and extending in a direction perpendicular to the slot formed in said fixture support when said locating block is assembled to said fixture, an intermediate block having a raised surface portion on one side thereof to be movably positioned within said slot of said support means and having a raised surface portion on the other side of the intermediate block to be movably positioned within said slot of said locating block, said slots and mating raised surface portions having rows of incrementally spaced selectively alignable holes adapted to accommodate one or more rods when positioned in aligned relationship and which may be removed from said holes and reinserted in other of said holes along said rows whereby said locating block may be locked in various positions; and means for manually relocating an initial reference position for said locating block after said locating block has been adjusted for one part and is then to be used for another part.

2. The locating block assembly of claim 1 wherein said means for manually relocating an initial reference position for said locating block includes predetermined ones of said holes in respective said slots and respective said raised surface portions being aligned at the initial reference position of said locating block, once adjustments are made to the position of said locating block creating new hole alignments, said locating block may be returned to said initial reference position established by realigning said predetermined ones of said holes.

3. The apparatus of claim 3 wherein said rows of holes are centered and arranged in a line along said slots and said raised surface portions.

4. The apparatus of claim 1 wherein said spacing between holes in said support means is equal.

5. The apparatus of claim 1 wherein said spacing between holes in said locating block is equal.

6. The apparatus of claim 1 wherein said spacing between holes in said intermediate block is equal.

7. An apparatus for use with a fixture to hold, guide, restrain or otherwise control a work piece, the apparatus comprising:

support means associated with said fixture;

an intermediate block secured to said support means, said intermediate block having a first raised portion on one side thereof and a second raised portion perpendicular to said first raised portion on the opposite side thereof;

a locating block secured to said intermediate block;

said support means and said intermediate block each having a first row of spaced holes, the spacing between said holes in said support means being different than the spacing of said holes in said intermediate block whereby selected ones of said holes may be aligned to allow relative adjustment of said intermediate block with respect to said support means; and said intermediate block and said locating block each having a second row of spaced holes, the spacing between said holes in said locating block being different than the spacing of said holes in said intermediate block whereby selected ones of said holes may be aligned to allow relative adjustment of said locating block with respect to said intermediate block.

8. The apparatus of claim 7 wherein said fixture support, intermediate block and locating block are secured together by one or more bolts passing through enlarged bolt holes in said fixture support, intermediate block and locating block.

9. The apparatus of claim 7 wherein said fixture support has a slot formed in one side thereof.

10. The apparatus of claim 7 wherein said locating block has a slot formed in one side thereof.

11. The apparatus of claim 7 wherein said first rows of holes is perpendicular to said second rows of holes.

12. The apparatus of claim 7 wherein said fixture support has a slot on one side thereof, said locating block has a slot on one side thereof perpendicular to said fixture support slot when assembled, said intermediate block having a first raised portion on one side thereof and a second raised portion on an opposite side thereof perpendicular to said first raised portion, said first raised portion engageably positioned within said slot of said fixture support and said second raised portion engageably positioned within said slot of said locating block.

13. The apparatus of claim 12 wherein said first and second rows of holes extend through said slots and said raised surface portions and are adapted to accommodate one or more rods to incrementally position said locating block with respect to said fixture support.

14. The apparatus of claim 12 wherein said slots of said fixed support and said locating block an said raised surface portions of said intermediate block are generally rectangular in cross section and sized to enable said raised surface portions to be longitudinally moveably positioned within said slots.

15. An improved adjustable locating block assembly for use on a fixture, to hold, guide, restrain, or otherwise control, a part to be adjoined in some fashion to another adjacent part, said locating block assembly comprising:

a fixture support having a slot formed in one side thereof, and a plurality of spaced holes extending through said fixture support and opening into said slot;

an intermediate block secured to said fixture support and having a first raised surface portion on one side thereof to be engageably positioned within said slot on said fixture support, a plurality of spaced holes in said raised surface portion selectively alignable with selected ones of said plurality of holes provided in said fixture support, a second raised surface portion on another side of said intermediate block, said second raised surface portion extending perpendicular to said first raised surface portion, said second raised surface portion having a plurality of spaced holes;

a locating block having a slot formed in one side thereof adopted to receive said second raised surface portion of said intermediate block, said locating block having a plurality of spaced holes opening into said slot selected ones thereof being alignable with selected ones of said plurality of holes in said second raised surface provided on said intermediate block;

said fixture support, intermediate block and locating block each having at least one enlarged bolt hole extending therethrough and being alignable so that a bolt of a diameter less than the diameter of said bolt hole may extend therethrough to releasably secure the fixture support, intermediate block and locating block together;

removable rod means adopted to be inserted into the selected aligned holes provided in said slots and raised surfaces to lock said locating block and said intermediate block in a selected position with respect to each other and to said fixture support.

* * * * *